UNITED STATES PATENT OFFICE.

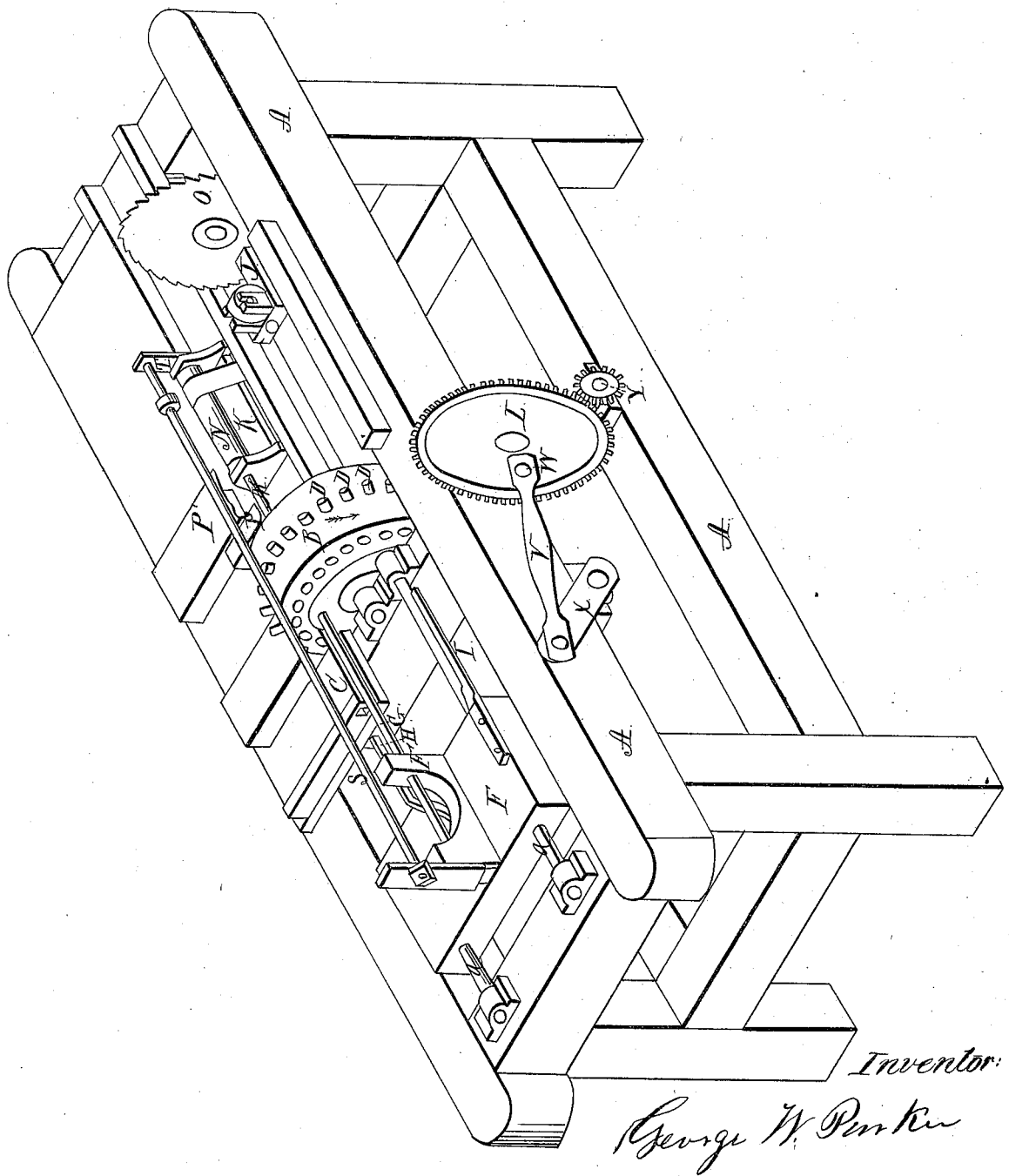

GEO. W. PARKER, OF FITZWILLIAM, NEW HAMPSHIRE.

MACHINE FOR MAKING CLOTHES-PINS.

Specification forming part of Letters Patent No. 14,466, dated March 18, 1856; Reissued February 17, 1857, No. 429.

*To all whom it may concern:*

Be it known that I, GEORGE W. PARKER, of Fitzwilliam, in the county of Cheshire and State of New Hampshire, have invented a new and useful Machine for the Making of Clothes-Pins, Pail-Handles, and other Articles; and I do hereby declare that the following is a full, clear, and exact description of the construction and operation of the same as correctly as I am able to describe it, reference being had to the accompanying drawings, making a part of this specification, in which the machine is shown in perspective.

This invention consists in the employment of a wheel or cylinder with holes near its circumference or of tubes placed near the circumference of a wheel; of a sliding or reciprocating lathe and tail block; of movable and stationary cutters or chisels; of a saw or bit according to the article being manufactured; of a feed board, and of other parts necessary to the operation of the several parts above mentioned.

The novel parts of the machine are refererd to by letters.

A, A, A, is the frame that supports the several parts.

B is the wheel or cylinder.

E, E, E, are the holes in the cylinder B into which the pieces of wood to be operated on are fed and by which the pieces are retained in, and moved forward to the right position for the action of the lathe, and also, to be forced into the carriage to be sawed or bound.

D, D, D, are pins fixed in the circumference of the wheel B and work in a grooved or worm wheel beneath the wheel B, and by which means, the wheel B is kept in an alternate state of motion and rest, any other contrivance to effect the same purpose may be used. The wheel B works in proper bearings and rotates in the direction indicated by the arrow.

K is a common lathe placed on ways at right angles to the wheel B and has a reciprocating motion to and from the wheel B. M is the mandrel and N the pulley. The lathe K is so placed that the axis of the mandrel M corresponds exactly with the axis of the holes E, E, E, as they come opposite to it. The lathe K is drawn toward the wheel B by a spring strong enough so that the spur of the mandrel M will seize upon the stick so firmly as to whirl it and sustain the action of the cutters; but is not held by the spring so strong but what it is readily forced back by the tail block.

F is the tail block and G is its mandrel, having a spur on its end toward the wheel B. The axis of the mandrel G corresponds exactly with the axis of the holes E, E, E, the same as the mandrel M of the lathe K, and the mandrels G and M and the holes E, E, E, are exactly in a line with one another. The tail block F has a reciprocating motion to and from the wheel B and at right angles to it, and slides on rods a, a, or on ways. Motion is given to the tail block F by a cog wheel working in a rack gear which is fastened to the under side of the tail block, and this rack gear and wheel are so arranged that when the tail block is nearest to the wheel B the rack gear is thrown out of connection with the gear wheel, and the tail block remains stationary an instant so that the movable chisel has time to operate. The gear wheel is fastened to the shaft to which the arm or crank X, is attached and receives motion by means of the crank X being connected by the sweep V to the crank pin W in wheel L, or any other contrivance may be used which will give the proper motion to the tail block. The punches H and I are attached to the tail block and move with it. The punch H is to push the square pieces from the feed board into the holes E, E. The punch I is to force the pieces out of the holes E, E, into the carriage J which carries the pieces to be sawed or bored. The carriage J has a reciprocating motion sliding on ways between the saw and wheel B. The stick is held firmly in hole c of the carriage J by a pulley or wheel pressed down by a spring on to the stick or by any other means to answer the purpose. The carriage J receives motion from the shaft to which the crank X is attached by means of a sweep connecting it with an arm on this shaft.

O, is the saw, or if an article is being made that requires to be bored instead of sawed, a bit is put in the place of the saw.

P, P', are the chisels or cutters made of the right form to shape the article made. P is stationary and P' is movable and is connected to the upper parts in any manner to give it a motion to and from the piece to be turned at the right time.

C, is the feed board on which the square pieces are placed to be fed into the holes E, E, E.

S, is a rod extending across from the tail block (to which it is permanently fastened), to the lathe and plays a short distance through a hole in the piece T which is permanently fastened to the lathe. The object of this rod is to move the lathe out of the way of the chisel in case no stick should be between the mandrels G, and M, or the stick while being turned should split or break; in these cases, the collar U on rod S strikes the piece T and moves the lathe out of the way. The pulley in the lathe should be a long one so as to allow the belt to slip as the lathe moves back and forth. The lathe is driven by a pulley directly under, and parallel with it. On the same shaft and at the farther end of the machine, as shown in the drawing, is the driving pulley for the whole machine. This shaft is connected to the shaft in which the small gear wheel Y is fastened by means of bevel gears and on the farther end of the shaft to which the wheel Y is attached is the pulley to drive the saw. The wheel Y being connected to the wheel L, motion is thereby given to the several parts that have been described.

The operation of the machine is as follows: The pieces of wood are placed upon the feed board C, and are pushed to the end of it nearest to the wheel B. The feed board is so placed that the holes E, E, as the wheel B rotates come into the right position for the pieces of wood to be pushed into the holes E, E, by the punch H, as it is moved forward by the tail block F to which it is attached. The pieces remain in the holes and are carried forward as the wheel B rotates until they arrive between the spurs of the lathe and tail block. The tail block F moves forward and the mandrel G forces the piece upon the spur of the lathe which stands close to the other end of the hole. The spur seizes the piece and causes it to revolve rapidly in the hole; as the tail block moves forward, the piece is carried along out of the hole and by the first and stationary cutter P which rounds it, the piece then remains stationary an instant and the second cutter P' moves up and shapes and finishes turning it. The tail block then moves back and the lathe follows, being drawn by the spring attached to it, and the piece is carried back and left in the same hole from which it was taken; the wheel B all this time remaining stationary. The wheel B now moves and the piece is moved out from between the spurs and the next hole containing a new piece comes into line with the spurs of the tail block and lathe, when the tail block again moves forward and the same operation is gone through with as before. The pieces after being turned are carried forward until they come into line with the hole in the carriage J, and the punch I. The punch I, moves forward and forces the pieces one after another as they are presented, into the carriage J, which carries them forward to be sawed, or bored. As a new piece is forced into the carriage J, it forces the other piece already in the carriage, out, and it drops between the carriage and saw and is conveyed out of the way by a spout or any other contrivance.

What I claim as my invention and desire to secure by Letters Patent is—

1. The use of holes in a wheel, or of tubes secured to a wheel, and into which the pieces of wood are fed and are thus retained in and carried forward to the proper position to be acted on by the lathe, saw or bit.

2. I claim a sliding or vibrating lathe and tail block, whereby the pieces of wood to be turned, are carried forward to the action of the cutters or chisels.

3. I claim the cutters or chisels in combination with the lathe and holes.

4. I claim, in combination with the holes, or saw, or bit, and a sliding or vibrating carriage or holder, or its equivalent to convey the pieces from the holes to the saw or bit.

GEORGE W. PARKER.

Witnesses:
DANIEL C. BISSELL,
WALES L. EGERTON.

[FIRST PRINTED 1912.]